United States Patent Office.

MORDECAI H. FLETCHER, OF CINCINNATI, OHIO, ASSIGNOR TO THE VEGETOL COMPANY, OF CINCINNATI, OHIO, A CORPORATION OF OHIO.

DENTIFRICE.

SPECIFICATION forming part of Letters Patent No. 693,349, dated February 11, 1902.

Application filed June 2, 1899. Serial No. 719,052. (No specimens.)

*To all whom it may concern:*

Be it known that I, MORDECAI H. FLETCHER, a citizen of the United States, residing at Cincinnati, in the county of Hamilton and State of Ohio, have invented a certain new and useful Composition of Matter, of which the following is a specification.

My invention is a composition of matter to be used principally as a dentifrice, its object being to produce an efficient dentifrice for use with a brush in the ordinary manner and which shall be free from the objections common to all or nearly all of the so-called "tooth-powders" to be found on the market.
The tooth-powders ordinarily sold usually contain earthy matter which is coarse enough to remove the calcareous deposits from the teeth, but which will also wear away and destroy the enamel and dentin. If fine enough to avoid this objection, they do not remove the tartar, and consequently fail to give a desirable result.

One principle of my invention is the avoidance of insoluble mineral or earthy ingredients, for which I substitute a perfectly-harmless organic or vegetable substance finely comminuted. As prepared by me the material is coarse enough to enter the depressions in the teeth and the spaces between them and about the gums to remove food, tartar, &c., but without exerting injurious abrasive action. A second principle is the combination or association of this vegetable matter with certain soluble chemical products in powdered form, which are dissolved slowly by the saliva in the mouth, and being alkaline in reaction they neutralize the acids of dental caries which may have begun, while their germicidal qualities destroy the bacteria of fermentation and putrefaction, and thus prevent future decay, (lactic acid produced by the lactic-acid ferment being the greatest source of decay of the teeth,) a further action being to render the mouth, as well as the surface of the teeth and the interstices between and around them, sterile, besides disinfecting the entire mouth and throat, and also acting as an emollient to the mucous membrane and skin.

In carrying out my invention I take a given quantity of the comminuted vegetable substance (giving preference to raw grains—such as rice, maize, or corn—from which the soft part of the kernel has been removed) and to this add about twelve per cent., by bulk, of ground sodium borate (borax) and about twelve per cent., by bulk, of ground potassium chlorate and small quantities of any suitable flavoring matters to give desirable flavor and odor. These substances are thoroughly mixed into a homogeneous dry powder, which is then ready for use. The solid chemical constituents of this mixture dissolve slowly, being so slowly soluble that they act in the first instance mechanically as a cleanser; but the particles remaining in the interstices of the teeth and about the gums slowly dissolve and sterilize the surfaces of the teeth and cavities and also render the acids of decay inactive or neutral by chemical union with those alkaline substances, and this action continues for some time after the use of the dentifrice, for it is well known that if the teeth are kept sterile and surgically clean and the saliva distinctly alkaline decay will not set in. The compound made and used being partly soluble dispenses with the use of mouth-washes. It has a neutralizing action, first, as an alkali upon acids produced by bacteria or acid foods, and, secondly, it is disinfectant, having a destructive action on bacteria, thus producing purity of mouth, sweetness of breath, and preventing disease. The chlorate in this mixture has an oxidizing effect upon the starches, fats, albuminoids, and nitrogenous foods, while the borate of soda is antiseptic and germicidal, both ingredients having a healing and cleansing effect, tending to keep the skin and mucous membranes in healthy condition.

While I suggest potassium chlorate and sodium borate as the most desirable substances to use in connection with the organic constituent or comminuted cereal, I do not confine myself to these nor to the precise proportions stated, as my invention lies in combining with the base of comminuted woody or vegetable matter as a mild detergent such soluble chemical constituents as will by their slow solution in water or the saliva of the mouth sterilize the interstices and fissures and produce the effect desired upon the teeth, skin, or mucous membranes.

What I claim as my invention is—

A composition of matter embodying a relatively large proportion of cereal matter and a smaller proportion of sodium borate and potassium chlorate, ground and mixed into a powder, adapted to be used in the mouth as a dentifrice and thereby, through action of the saliva, to produce detergent and antiseptic effects, substantially as set forth.

In testimony whereof I affix my signature in presence of two witnesses.

MORDECAI H. FLETCHER.

Witnesses:
L. C. HOSEA,
W. A. KNIGHT.